United States Patent
Senckowski

(10) Patent No.: US 6,898,892 B2
(45) Date of Patent: May 31, 2005

(54) APPARATUS AND METHOD FOR FISHING UTILIZING THE JIG FISHING SYSTEM

(76) Inventor: John F. Senckowski, 46 Holden St., Holden, MA (US) 01520

( * ) Notice: Subject to any disclaimer, the term of this patent is extended or adjusted under 35 U.S.C. 154(b) by 0 days.

(21) Appl. No.: 10/640,982

(22) Filed: Aug. 14, 2003

(65) Prior Publication Data

US 2004/0107624 A1 Jun. 10, 2004

Related U.S. Application Data

(60) Provisional application No. 60/403,383, filed on Aug. 14, 2002.

(51) Int. Cl.$^7$ .............................................. A01K 97/12
(52) U.S. Cl. ................... 43/16; 43/17; 43/17.5
(58) Field of Search .............................. 43/4.5, 16, 17, 43/17.5, 21.2; 248/519–520, 524–527

(56) References Cited

U.S. PATENT DOCUMENTS

| | | | |
|---|---|---|---|
| 4,964,233 A | | 10/1990 | Benson et al. |
| 5,020,263 A | * | 6/1991 | Werner ........................... 43/17 |
| 5,050,333 A | * | 9/1991 | Debreczeni .................... 43/17 |
| 5,063,373 A | | 11/1991 | Lindsley |
| 5,185,949 A | | 2/1993 | Patterson |
| 5,218,781 A | * | 6/1993 | Miller .......................... 43/100 |
| 5,570,532 A | | 11/1996 | Shaffer et al. |
| 5,903,998 A | | 5/1999 | Hawkins et al. |
| 5,987,801 A | | 11/1999 | Anderson |
| 6,094,852 A | | 8/2000 | Roach |
| 6,293,043 B1 | | 9/2001 | Zwettler |
| 6,341,443 B1 | | 1/2002 | Watford et al. |
| 6,389,734 B1 | * | 5/2002 | Niles et al. ..................... 43/17 |

* cited by examiner

Primary Examiner—Teri Pham Luu
Assistant Examiner—T. Nguyen
(74) Attorney, Agent, or Firm—Evelyn M. Marshall, Esq.

(57) ABSTRACT

The present invention uses the Jig Fishing System™ to achieve a more effective and enjoyable way of ice fishing. By practicing the disclosed invention, the skilled practitioner will now enjoy quick set-up, enhanced monitoring, and more effective, safer, warmer, dryer and more social ice fishing. The advantages of using the present invention include: easy set-up, storage and transportability of the ice fishing devices; easier and more effective fish detection monitoring, including fish detection monitoring from a distance; warmer, dryer, safer and more social ice fishing; and the ability to have reliable fish strike monitoring and signaling during the day, night or inclement weather.

11 Claims, 9 Drawing Sheets

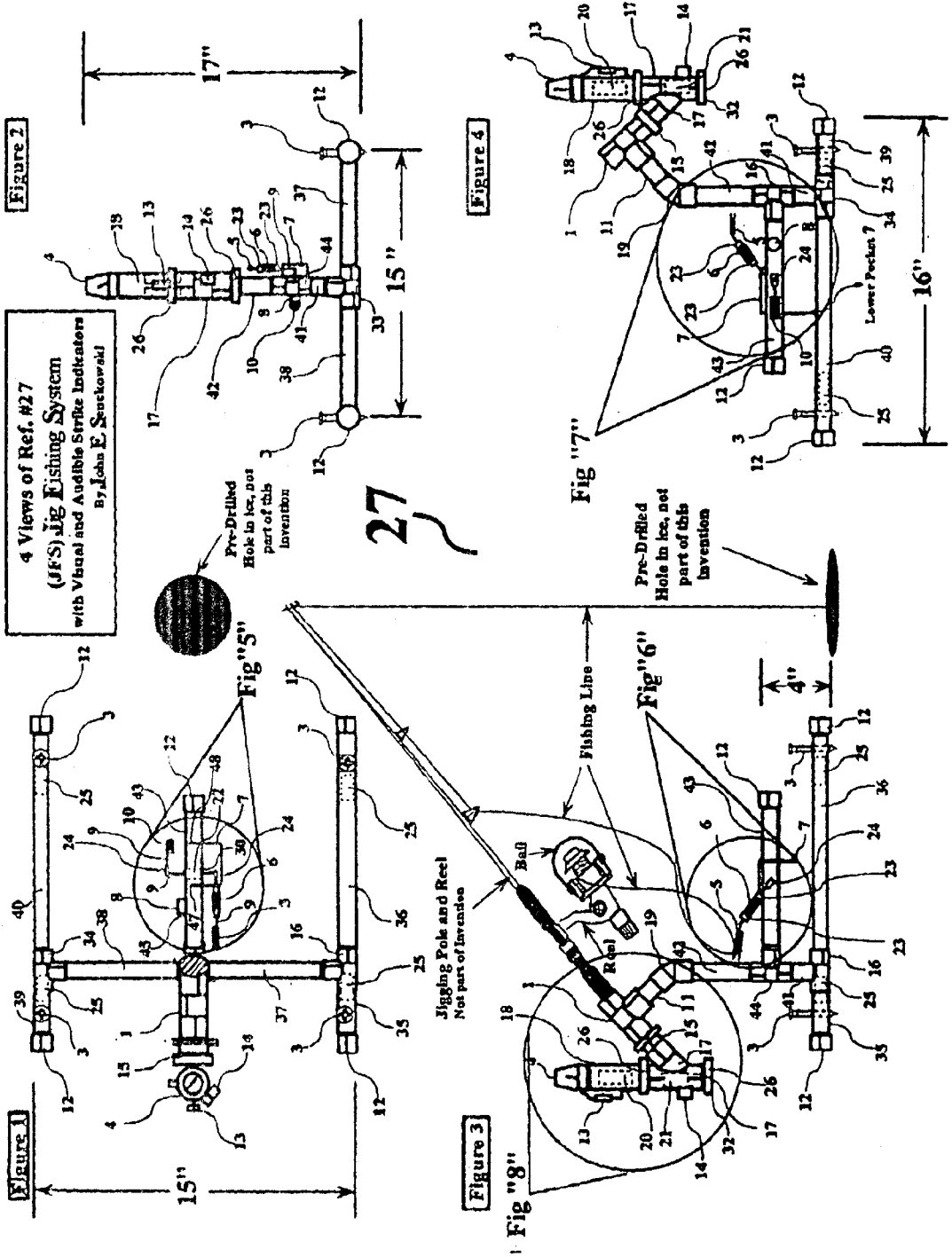

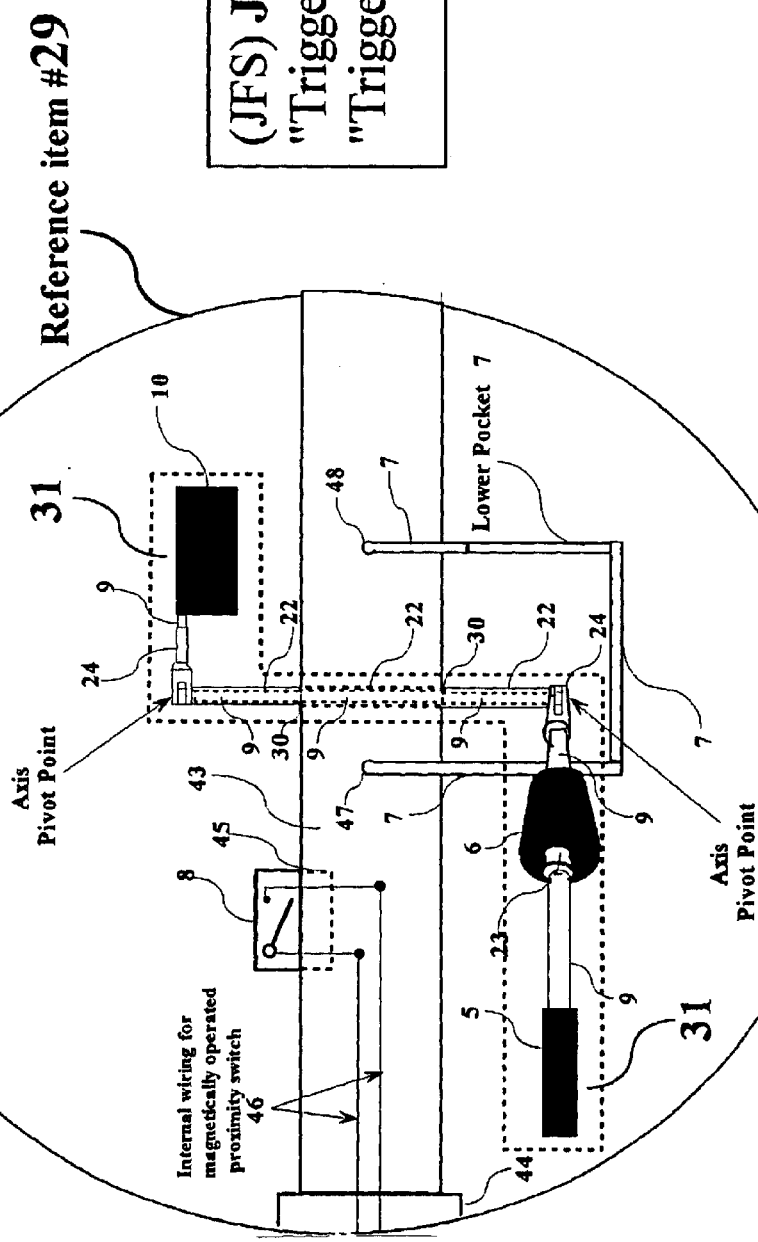

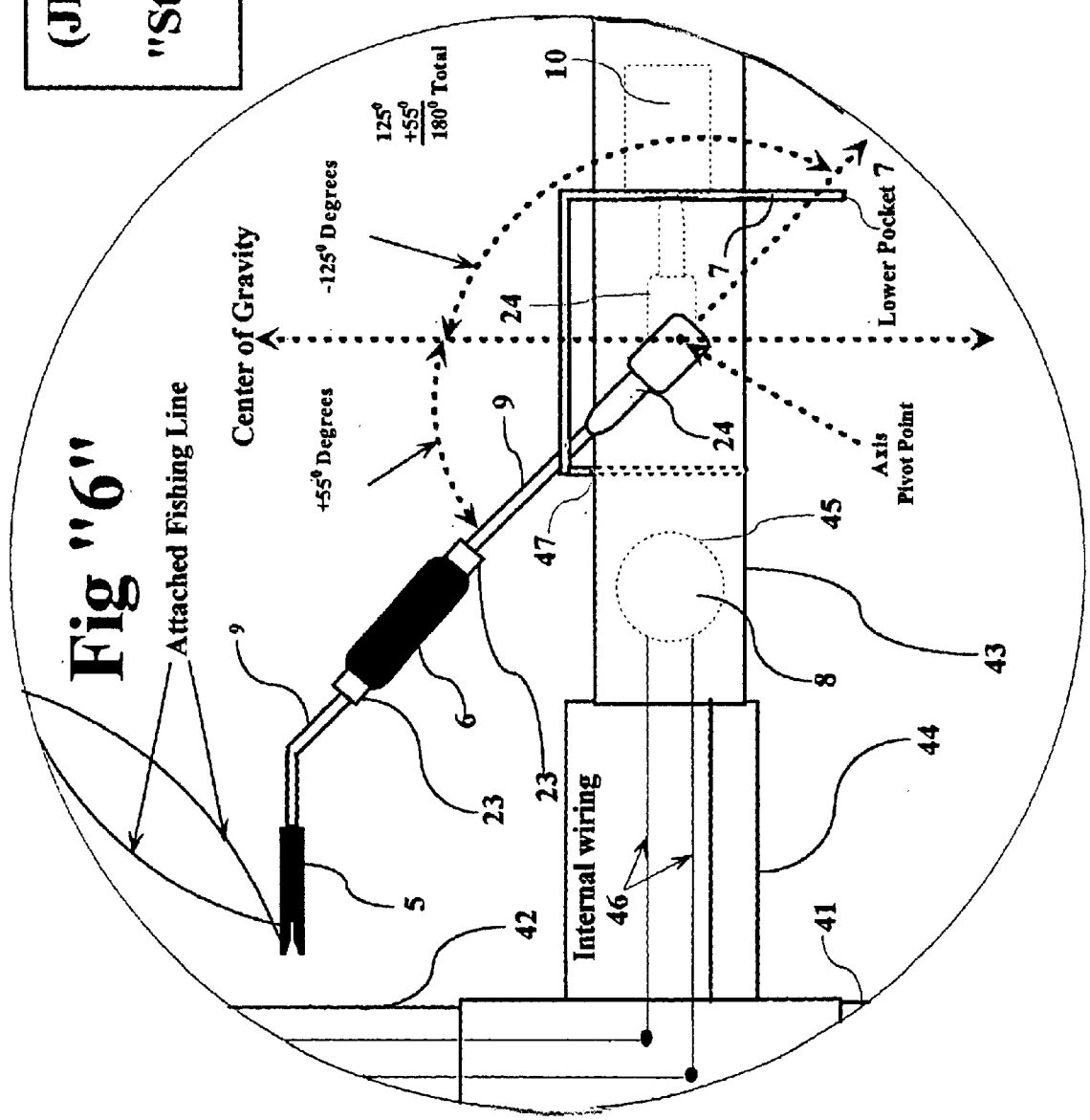

Fig "7"

(JFS) Jig Fishing System
Left Side View of
"Strike Indicator trigger"

Inventor John F. Senckowski

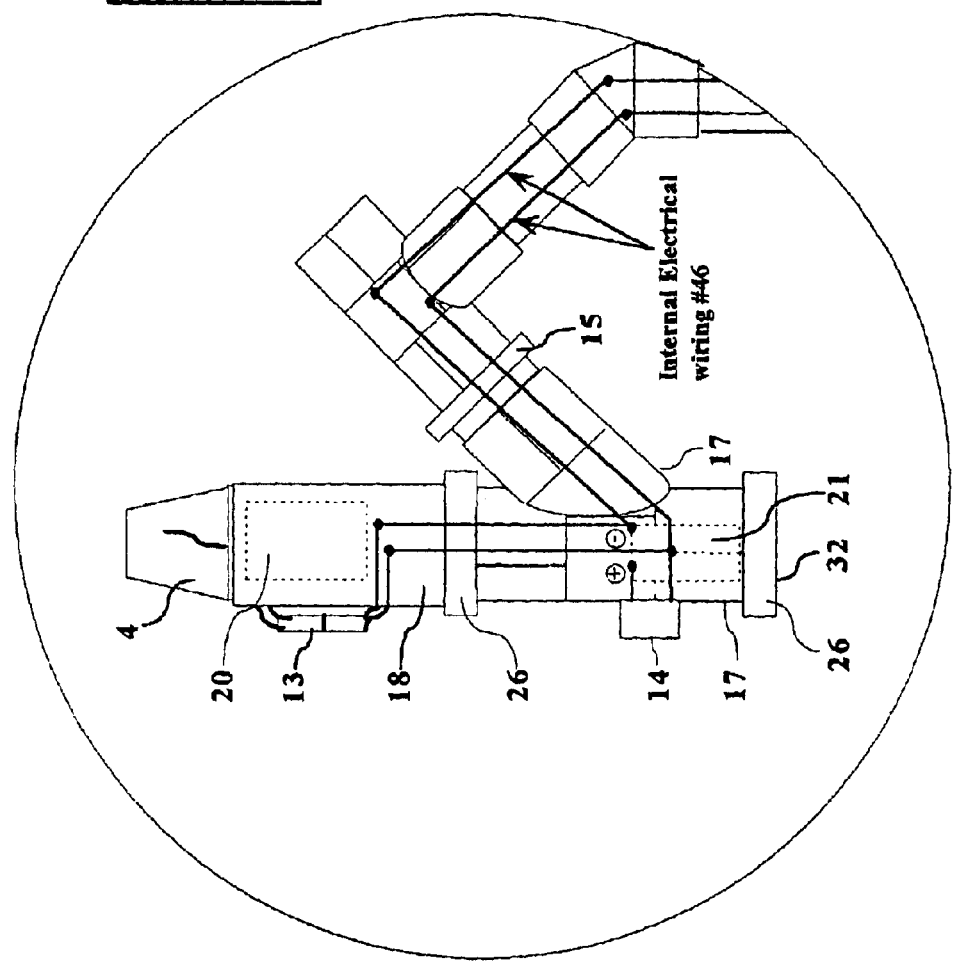

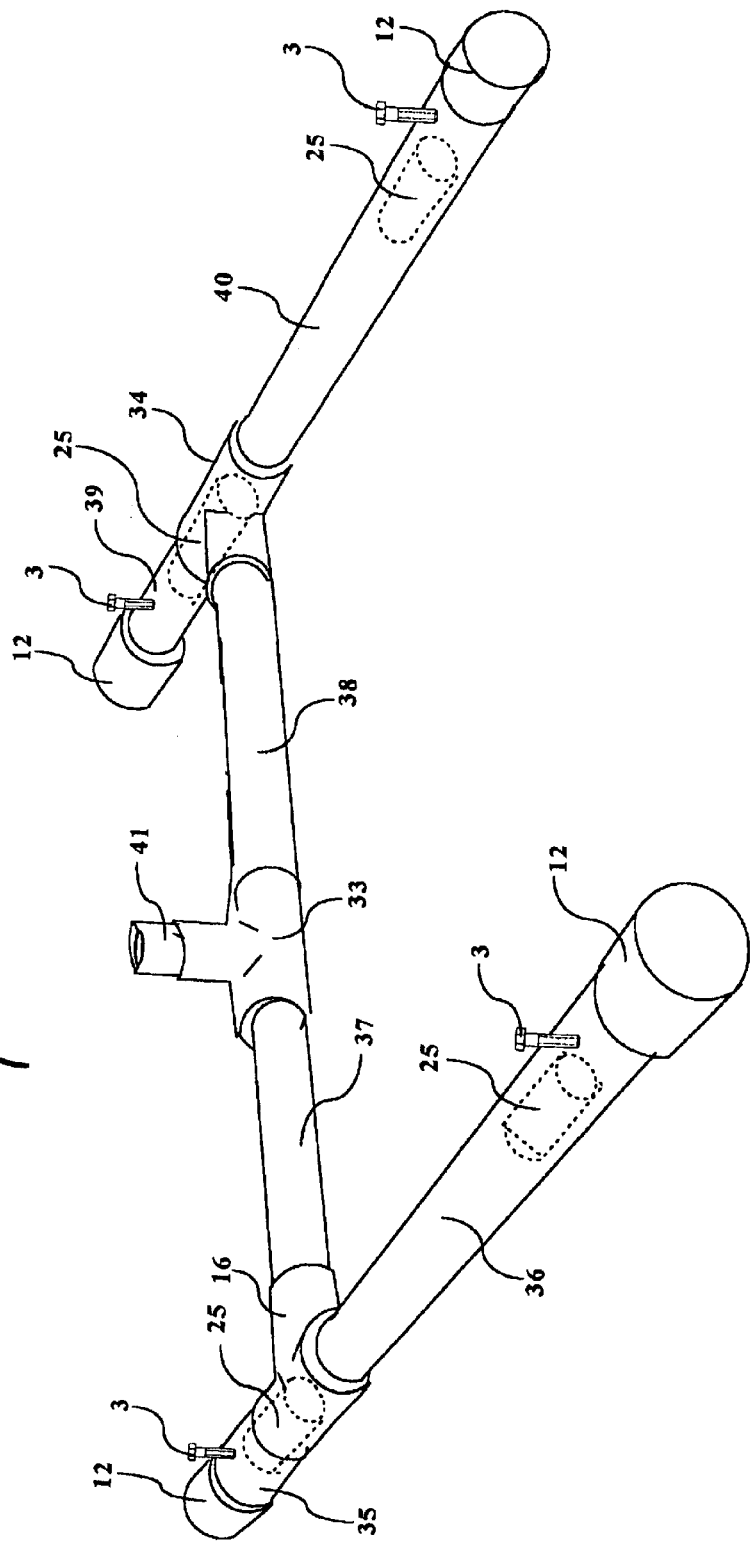

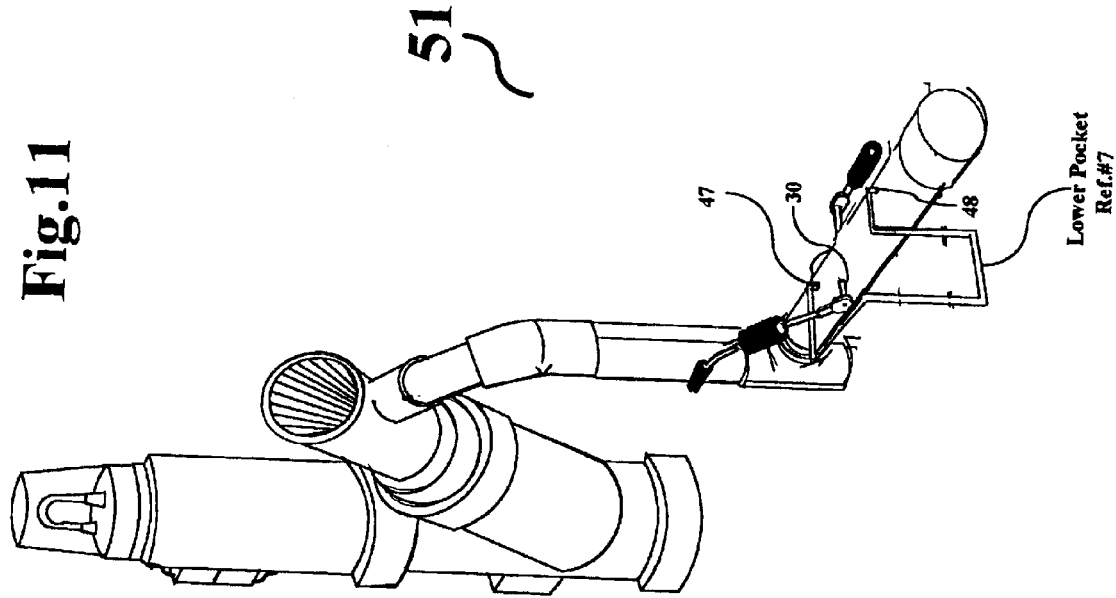

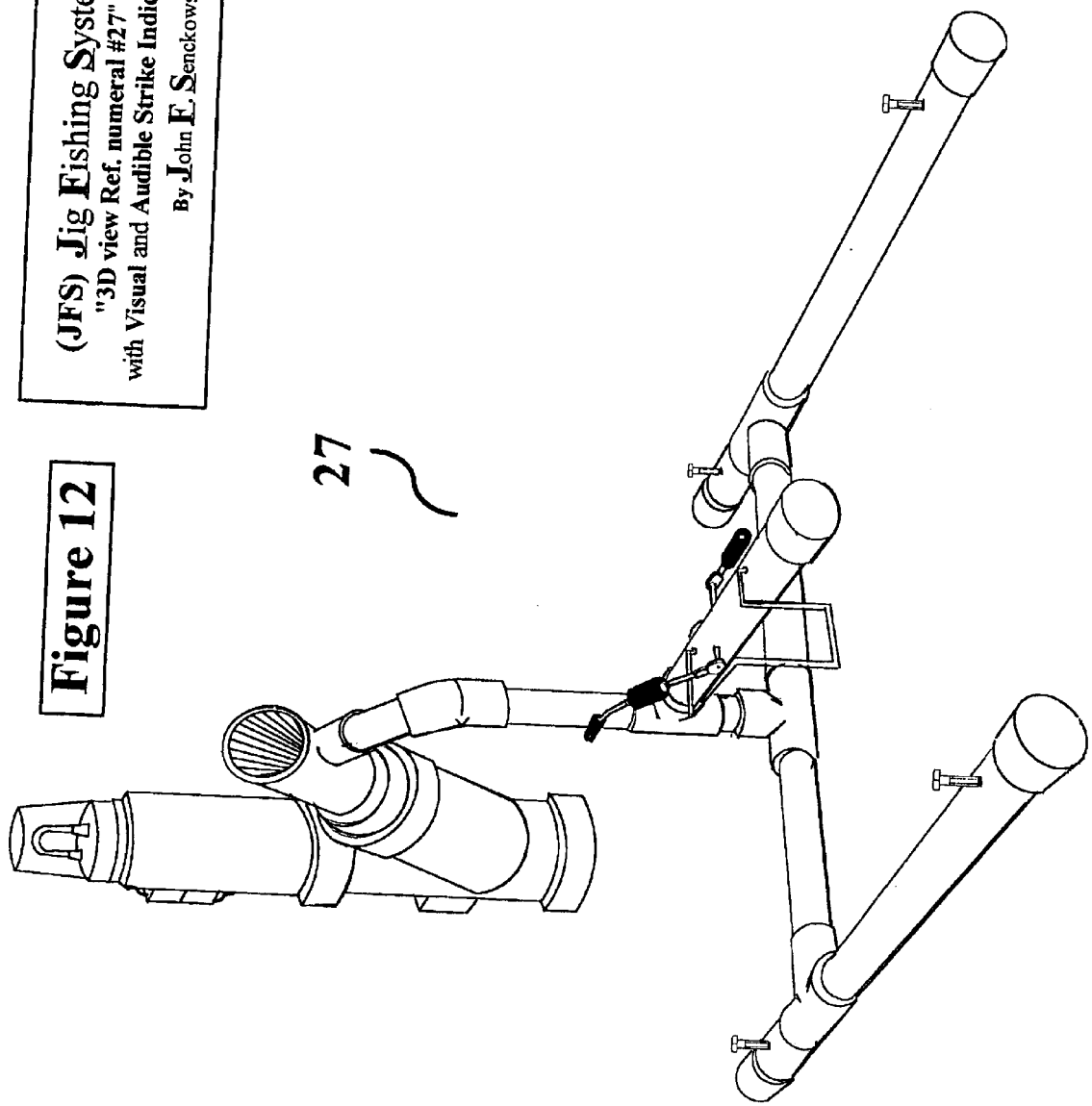

APPARATUS AND METHOD FOR FISHING UTILIZING THE JIG FISHING SYSTEM

CROSS-REFERENCE TO RELATED APPLICATIONS

This application pends form provisional application No. 60/403,383 filed Aug. 14, 2002.

STATEMENT REGARDING FEDERALLY SPONSORED RESEARCH AND DEVELOPMENT

This invention has been created without the sponsorship or funding of any federally sponsored research or development program.

REFERENCE TO A "MICROFICHE APPENDIX"

Not Applicable

BACKGROUND OF THE INVENTION

1. Field of the Invention

The present invention relates generally to fishing, and more specifically to an apparatus and method of ice fishing utilizing a jigging fishing rod holder with visual and audible signaling mechanisms.

2. Prior Art

Ice Fishermen are generally limited in their choices as to devices to assist and monitor ice fishing. Ice Fishermen generally use a device called a Tilt or Tip-Up to assist the ice fisherman in fishing and monitoring when a fish has been caught. The Tilt/Tip-Up is a device that generally has two horizontally extending members that intersect through their midway points. Said members are each approximately three feet long and selectively open and close. In said open position, said horizontal members intersect at their mid-way points creating 90 degree angles to each other, and are used as the base for the Tilt/Tip-Up. In said closed position, said horizontal members are adjacent and parallel to each other for storage. Connected to the top side of said intersecting horizontal members is the signaling system to alert a fisherman that a fish is on the line, said line being connected to said Tilt/Tip-Up through a signaling mechanism, said mechanism being triggered by movement of said line which releases a flag to notify the fisherman of a potential fish on said line.

Advanced signaling devices have been developed that provide visual and audible signaling to bank fishermen and fishermen on boats, but advanced signaling is generally not available and has not been specifically designed for ice fishing. Furthermore, said advanced signaling devices are not made to be seen or heard from a distance, may not be seen in bright daylight and are not designed for inclement weather use where the visibility is low.

And still further, many types of stands have been developed to hold a fishing rod while the bank or boat fisherman is waiting for a catch, and stands have even been developed for ice fishing, but none have been developed that are suitable for ice fishing, that are light-weight, can be easily set up and broken down, and stored.

Therefore, even though the Tilt/Tip-Up is the device most widely used for ice fishing it does have some drawbacks.

Firstly, fishermen typically scatter themselves over the surface of the ice so that they are not in close proximity to each other's Tilts/Tip-Ups, thus potentially increasing the chances of catching fish. Each fisherman typically places the maximum number of Tilts/Tip-Ups allowed in relatively close proximity to himself/herself for ease of monitoring. Such relative close proximity is typically desired since the signaling devices typically cannot be seen or heard, or are difficult to see or hear, from a distance, whether it is the day or night, or the weather conditions are good, fair or inclement. Such scattering of fishermen reduces the social nature of ice fishing and reduces the safety of the ice fishermen. It is typically the social nature of ice fishing that draws ice fishermen to the sport, thus the social limitations significantly reduce the enjoyment of this activity.

Secondly, the signaling device is sometimes tripped by the wind and therefore is an unreliable indicator of whether a fish is on or near a line. Thirdly, since the Tilt/Tip-Up does not utilize a fishing rod or fishing rod holder, when the ice fisherman suspects a fish is on the line, the fisherman must remove his winter gloves, kneel on the ice, and retrieve the line by hand; thus the fisherman typically gets very cold and wet. And fourthly, the Tilt/Tip-Up is easily tangled during storage making set-up of the Tilt/Tip-Up cumbersome.

There is therefore a need in the art for an effective ice fishing system and/or apparatus that provides a less cumbersome, more reliable method of ice fishing which allows the fisherman to stay warm and dry while creating a more social environment and more enjoyable experience during the day or night.

It is therefore a principal object of the present invention to provide a fishing system that eliminates the need for the fisherman to kneel on the wet ice, manipulate the fishing line with bare hands in freezing temperatures such as; setting the hook by pulling on the fishing line, bringing the fish back up through the ice by pulling the line hand over hand, or retrieving the fishing line to see if a fish has been caught.

A further object of the present invention is to provide a fishing system that has a more reliable fish indicator that will also be recognized from a distance.

A further object of the present invention is to provide a fishing system that is quick and easy to set up and break down that is neat and easily stored.

A further object of the present invention is to provide a fishing system that may be used during the day or night and in inclement weather.

With these and other objects in view, as will be apparent to those skilled in the art, the invention resides in the combination of parts set forth in the specification and covered by the claims appended hereto.

BRIEF SUMMARY OF THE INVENTION

A novel approach to ice fishing has now been discovered, thus providing ice fishermen with improved modes of ice fishing. The present invention uses the Jig Fishing System™ to achieve a more effective and enjoyable way of ice fishing. By practicing the disclosed invention, the skilled practitioner will now enjoy quick set-up, enhanced monitoring, and more effective, safer, warmer, dryer and more social ice fishing. The advantages of using the present invention include: easy set-up, storage and transportability of the ice fishing devices; easier and more effective fish detection monitoring, including fish detection monitoring from a distance; warmer, dryer, safer and more social ice fishing; and the ability to have reliable fish strike monitoring and signaling during the day, night or inclement weather.

These and other objects will be apparent to those skilled in the art, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 1 is a top perspective view of the Jig Fishing System™ according to the invention;

FIG. 2 is a rear perspective view of the Jig Fishing System™ according to the invention;

FIG. 3 is a right side perspective view of the Jig Fishing System™ according to the invention;

FIG. 4 is a left side perspective view of the Jig Fishing System according to the invention;

FIG. 5 is a top perspective view of the Strike Indicator Trigger according to the invention;

FIG. 6 is a right side perspective view of the Strike Indicator Trigger according to the invention;

FIG. 7 is a left side perspective view of the Strike Indicator Trigger according to the invention;

FIG. 8 is a right side perspective view of the Audible and Visual Strike Indicators according to the invention;

FIG. 10 is a three dimensional view of the base support of the Jig Fishing System™ according to the invention;

FIG. 11 is a three dimensional view of the top section of the Jig Fishing System™ according to the invention; and FIG. 12 is a three dimensional view of the Jig Fishing System™ according to the invention.

NUMBERING OF THE DRAWINGS

Figure 9:
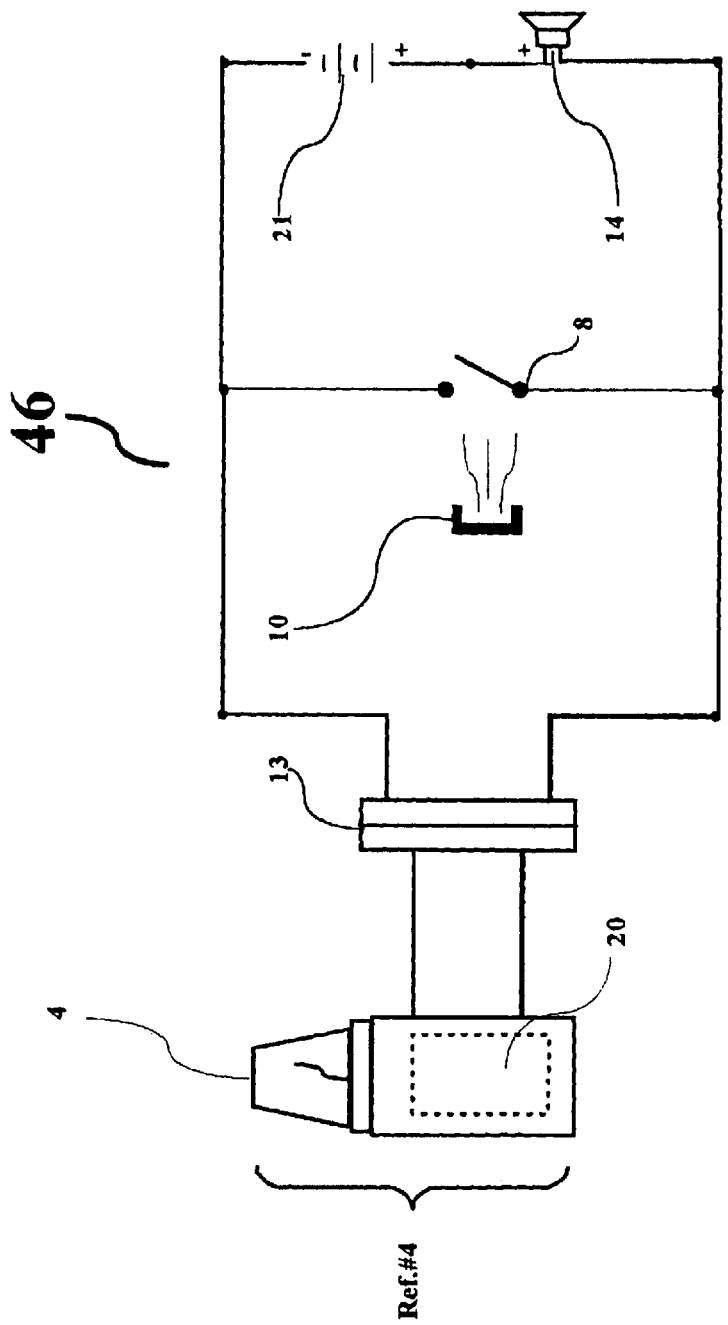
FIG. 9 is an electrical wiring diagram for the Audible and Visual Strike Indicators.

1. Jig Fishing System™ rod holder
2. Jig Fishing System™ base support
3. Wind Drag Screws
4. Visual Fish Strike Indicator
5. Fishing Line Holder
6. Counter Weight
7. Trigger/Stop Bracket
8. Proximity Switch
9. Trigger
10. Switch Activator
11. ½" Support
12. End Cap
13. Wiring Harness Connector
14. Audible Fish Strike Indicator
15. Wye/Tee Reducer
16. Tee
17. Wye Support/Extender
18. Extension
19. 45° Elbow
20. Visual Fish Strike Indicator Power Source
21. Audible Fish Strike Indicator Power Source
22. Internal Sleeve
23. Locking Collar
24. 90° Yoke
25. Ballast
26. Reflection Means
27. Jig Fishing System™
28. Jig Fishing System™ Signal Support
29. Triggering System
30. Bore
31. Triggering Arm
32. Audible Fish Strike Indicator Power Source Bottom Mount
33. Tee Connector
34. Tee Connector
35. Length of Tubing
36. Length of Tubing
37. Length of Tubing
38. Length of Tubing
39. Length of Tubing
40. Length of Tubing
41. Length of Tubing
42. Length of Tubing
43. Length of Tubing
44. Tee Connector
45. Bore
46. Electrical Wiring
47. Bore
48. Bore
49. Trigger Support
50. Rod Holder Support
51. Top Section of the Jig Fishing System™

DETAILED DESCRIPTION OF THE INVENTION

In the broadest aspects, the present invention provides the skilled artisan with the analytical tools and technical know-how sufficient to make and use the disclosed invention. The present invention provides fisherman with a fishing system that is easy to set-up, store and transport. Said system utilizes improved strike detection monitoring, thus increasing the enjoyability and socialability of fishing, and more particularly ice fishing. Said system also utilizes a jigging rod holder, thus enabling a warmer, dryer and safer ice fishing experience.

Referring first to FIGS. 1–12, wherein like elements are indicated by like numerals, the Jig Fishing System™ of the present invention, in its most basic form, is generally indicated by the reference numeral 27, and comprises a rod holder support, generally indicated by reference numeral 50, a signal support, generally indicated by reference numeral 28, a base support, generally indicated by reference numeral 2, and a trigger support, generally indicated by reference numeral 49. The Jig Fishing System™ 27 is shown in functional form, supporting a Jigging Pole, but may be disassembled for easy storage and transportability within a Jig Fishing System™ Storage Box designed to fit numerous Jig Fishing Systems along with their Jigs.

In further detail, said rod holder support 50 is comprised of length of tubing 42, 45 degree elbow 19, length of tubing 11, and rod holder 1. Said rod holder I is tubing in the shape of a standard tee shaped plumbing component, and comprises a first end 1a, a second end 1b, and a side connector 1c. Said first end 1a defines an opening to hold most any size fishing jigging pole and reel. Said second end 1b defines an opening for connection to said signal support 28. Said side connector 1c defines an opening for connection to said length of tubing 11. Said length of tubing 11 has a first end 11a and a second end 11b. Said first end 11a defines an opening to connect to said rod holder side connector 1c. Said second end 11b defines an opening to connect to said 45 degree elbow 19. Said 45 degree elbow 19 has a first end 19a and a second end 19b. Said first end 19a defines an opening to facilitate connection to said length of tubing second end 11b. Said second end 19b defines an opening to facilitate connection to length of tubing 42. Said length of tubing 42 has a first end 42a and a second end 42b. Said first end 42a defines an opening to connect to 45 degree elbow second end 19b. Said second end 42 defines an opening to connect to trigger support 49.

Said signal support 28 is comprised of a wye support 17, an extension 18, and wye/tee reducer 15. Said extension 18 is a measure of tubing having a first end 18*a*, and a second end 18*b* and of the size to house the visual strike indicator 4 and the visual strike indicator power source 20. Said first end 18*a* defines an opening to house said visual strike indicator 4 and said visual fish strike indicator power source 20. Said visual strike indicator 4, allows the use of the Jig Fishing System™ during the day or night, in inclement weather or bright sunlight. In the preferred embodiment, said visual strike indicator 4, is a high intensity strobe light, easily seen up to 300 feet away during the brightest daylight hours, and over 800 feet away during evening hours. Said visual strike indicator 4, can penetrate the thickest fog or rain conditions by reflecting and amplifying light through each water droplet and is generally of the type or similar to a RADIO SHACK Personal Safety Strobe. Said visual strike indicator power source 20 is contained within said visual strike indicator 4 and powered by 1 "C" type battery and may vary according to the visual strike indicator's 4 power requirements. Said second end 18*b* connects to said wye support 17. Said wye support 17 is tubing in the shape of a standard wye shaped plumbing component and has a first end 17*a*, a second end 17*b* and a connector 17*c* and of the size to house the audible fish strike indicator 14 and the audible fish strike indicator power source 21. Said audible fish strike indicator 14, is generally of the type and similar to an 85 decibel piezoelectric indicator or more specifically the RADIO SHACK Mini Buzzer that is easily heard from over 150 feet away. Said first end 17*a* defines an opening to house said audible fish strike indicator 14 and the audible fish strike indicator power source 21, and to connect to said extension second end 18*b*. Said audible strike indicator power source 21 is contained within said audible strike indicator 14 and powered by 2 "AA" type battery and may vary according to the audible strike indicator's 14 power requirements. Said second end 17*b* defines an opening to house an audible fish strike indicator power source bottom mount, generally indicated by reference numeral 32. Said wye support connector 17*c* defines an opening to connect to said wye/tee reducer 15. Said wye/tee reducer 15 is tubing in the shape of a standard plumbing component of the type to facilitate connection between different size tubing, having a first end 15*a* and a second end 15*b*. Said first end 15*a* defines an opening to connect to said Jig Fishing System™ rod holder second end 1*b*. Said second end 15*b* defines an opening to connect to said wye/support connector 17*c*. Said exterior bases of said extension 18 and wye support 17 are covered with a light sensitive and highly reflective reflective means, generally indicated by reference numeral 26, such that said reflective means 26 can be seen from any angle during nighttime or inclement weather with the use of a standard flash light.

Said base support 2 comprises lengths of tubing 35, 36, 37, 38, 39 and 40, several standard tee shaped plumbing components 16, 33 and 34, wind drag screws 3, end caps 12, and ballast 25. Said lengths of tubing 35 and 39 have a first ends 35*a* and 39*a*, respectively, second end 35*b* and 39*b*, respectively, and generally are a fraction of the length of lengths of tubing 36 and 40. Said first ends 35*a* and 39*a* define openings that are concealed by end caps 12. Said first ends 35*a* and 39*a* include a bore to house said wind drag screws 3. Said first ends 35*a* and 39*a* also provide housing for said ballast 25. Said second ends 35*b* and 39*b* define openings to connect to tee connector 16 and 34 respectively. Said tee connectors 16, 33 and 34 have a first ends 16*a*, 33*a* and 34*a*, respectively, second ends 16*b*, 33*b* and 34*b*, respectively, and side connectors 16*c*, 33*c* and 34*c*, respectively, and consist of tubing in the shape of a standard tee shaped plumbing component used to connect three pieces of piping in the shape of a T. Said lengths of tubing 36 and 40 have first ends 36*a* and 40*a*, respectively, and second ends 36*b* and 40*b*, respectively. Said first ends 36*a* and 40*a* define openings to connect with said tee connectors 16 and 34, respectively, via tee connectors second ends 16*b* and 34*b*, respectively. Said second ends 36*b* and 40*b* define openings that are concealed by end caps 12. Said second ends 36*b* and 40*b* include a bore to house said wind drag screws 3. Said second ends 36*b* and 40*b* also provide housing for said ballast 25. Said lengths of tubing 37 and 38 have first ends 37*a* and 38*a*, respectively, and second ends 37*b* and 38*b*, respectively. Said first ends 37*a* and 38*a* define openings to connect with said tee connectors 16 and 34, respectively, via tee connectors side connectors 16*c* and 34*c*, respectively. Said second ends 37*b* and 38*b* define openings to connect with said tee connector 33 via tee connector first end 33*a* and tee connector second end 33*b*, respectively. Said tee connector side connector 33*c* connects trigger support 49.

Said trigger support 49 comprises lengths of tubing 41 and 43, tee connector 44, end cap 12, and a triggering system, generally indicated by reference numeral 29. Said length of tubing 41 has a first end 41*a* and a second end 41*b*. Said first end 41*a* defines an opening to connect to tee connector 44. Said second end 41*b* defines an opening to connect to tee connector side connector 33*c*. Said tee connector 44 has a first end 44*a*, a second end 44*b* and a side connector 44*c*. Said tee connector first end 44*a* defines an opening to facilitate connection to length of tubing second end 42*b*. Said tee connector second end 44*b* defines an opening to facilitate connection to length of tubing 41*a*. Said tee connector side connector 44*c* defines an opening to facilitate connection with length of tubing 43. Said length of tubing 43 has a first end 43*a* and a second end 43*b* and a bore 30 in said tubing to provide mounting for said triggering system 29. Said length of tubing first end 43*a* defines an opening to connect with said tee connector side connector 44*c*. Said length of tubing second end 43*b* defines an opening that is concealed by end cap 12.

Said Jig Fishing System™ 27 is preferably made out of polyvinyl chloride ("PVC") tubing but may also be made out of material known by one of ordinary skill in the art that is lightweight, rustproof and suitable for outdoor use. In the preferred embodiment, said Jig Fishing System's™ tubed structure is molded and comprised of two elements, a top section 51 and the base support 2, which allow the Jig Fishing System™ to be easily collapsed at the intersection of length of tubing first end 41*a* and tee connector second end 44*b*, and to have a more streamlined design. Said collapsibility allows for quick and easy set-up and breakdown, i.e., less than one minute.

Said signaling system is comprised of a proximity switch 8, triggering arm 31, and a trigger/stop bracket 7. Said proximity switch 8 is mounted in bore 45 on said length of tubing 43 in such a location as to close electrical circuit 46 when said switch activator 10 is in close proximity to said proximity switch 8. Said proximity switch 8 is made up of a material known to those of ordinary skill in the art that would facilitate the closing of a circuit and is generally of the type or similar to a RADIO SHACK Proximity Reed Switch. Said triggering arm 31 is mounted on said length of tubing 43 through internal sleeve 22 and bore 30 and is comprised of a fishing line holder 5, a trigger 9, a counter weight 6, two 90 degree yokes 24*a* and 24*b*, locking collars 23, and switch activator 10. Said fishing line holder 5 has a first end 5a and a second end 5b, may be cylindrical in shape and may be made of a flexible rubber or other material known by one of ordinary skill in the art. Said first end 5a is in the shape of a V and has a slit to allow said first end 5a to hold the fishing line. Said second end 5b is connected to trigger 9. Said trigger 9 is made up of approximately 11/16" rod type stock and is made up of three lengths of stock, 9a, 9b and 9c. Said first length 9a has a first end 9a' and a second end 9a". Said first end 9a' has a 45 degree bend approximately ¼ inch from its end. Said second end 9a" inserts into the end of said 90 degree yolk 24a. Said counter weight 6 is approximately ¾ ounce and generally made of a length of weighted tubing and is mounted onto first length 9a by locking collars 23. All of which are well known to one of ordinary skill in the art. Said length of stock 9b has a first end 9b' and a second end 9b". Said first end 9b' inserts into the side of said 90 degree yolk 24a. Said second end inserts into the side of said 90 degree yolk 24b. Said length of stock 9c has a first end 9c' and a second end 9c". Said first end 9c' connects to switch activator 10. Said switch activator 10 is a cylindrically shaped metal component. Said second end 9c" inserts into the end of said 90 degree yoke 24b. Said trigger/stop bracket 7 is comprised of approximately 11/16 rod type stock and is connected to length of tubing 43 via bores 47 and 48. Said trigger/stop bracket 7 is shaped as indicated on FIG. 5 with the foremost section creating a lower pocket to allow continuous signaling.

When said signaling system is activated the signal is transmitted through internal wiring to said audible fish strike indicator 14 and said visual strike indicator 4. Said internal wiring is shown in FIGS. 5, 6, 7, and 8. Said internal wiring is also depicted in the electrical wiring diagram of FIG. 9. Said internal wiring is standard and well known to those of ordinary skill in the art.

In practice the system works as follows: The fisherman sets up the Jig Fishing System™ by connecting the base support 2 to the top section 51 at the intersection of length of tubing first end 41a and tee connector second end 44b. The fisherman then sets the line, inserts the rod into rod holder 1, and attaches the fishing line to the fishing line holder 5, which quickly secures the fishing line from any fishing reel of any type, set to run free, or its bail set to the open position. The Jig Fishing System™ monitors and signals as follows: 1) the targeted fish swallows the baited hook; 2) as the targeted fish starts his get away with the baited hook and line, the tension on the fishing line increases which rotates the fishing line holder 5, and subsequently the trigger mount 9, in an upward forward direction, shown in figure C. The trigger mount 9 has a frictionless, near zero, drag coefficient at their fixed pivot points due to the 90 degree turn [yolks 24a and 24b] and the internal and external sleeves 22. Such minimal drag is important such that it will prevent the targeted fish from sensing any anomalies associated with catching its prey, i.e., resistance, which would cause the targeted fish to eject the bait. Contemporaneously, trigger first end 9a' rotates in a pendulum fashion; 3) The switch activator 10 will travel at an equal distance and angle to fishing line holder 5, but in the opposite direction, at their respective pivot points; 4) The trigger 9 continues to rotate in the upward direction due to line tension, and approaches approximately 55 degrees from its originating position. This is known as the top dead center (TDC) of its rotation; 5) Counter weight 6 takes over the non-stop rotation, and accelerates into a free gravitational fall while the fishing line holder 5 releases the fishing line at approximately TDC due to gravitational forces exerted on the counter weight 6 and the unique light holding pressure exerted on the fishing line by the fishing line holder 5; 6) As trigger mount 9 continues without stopping through its rotation from TDC for an additional 125 degrees, its rotation ends abruptly at the bottom of it's full and total 180 degree swing by virtue of coming in contact with the lower portion of the trigger support/stop bracket 7 and counter weight 6 now acts as a de-bouncing device to help prevent the trigger mount 9 from back lashing to its original position. Simultaneously, the switch activator 10 has continued to rotate at an equal angle and distance in the opposite direction as fishing line holder 5 and trigger mount 9, i.e. a full 180 degrees. This is all in the effort to bring switch activator 10 to its intended position of being in close proximity to the proximity switch 8; 7) Switch activator 10 being in close proximity to proximity switch 8 causes the electrical contacts of proximity switch 8 to close and complete the circuit to audible fish strike indicator 14 and visual fish strike indicator 4; 8) Audible fish strike indicator 14, powered by the audible fish strike indicator power source, preferably two "AA" batteries, will begin to emit a steady and distinctive audible alert. Said alert will be at a level of approximately 85 decibels which can be easily heard from over 150 feet away, alerting the fisherman to the strike. Simultaneously, visual fish strike indicator 4, powered by visual fish strike indicator power source 20, preferable one "C" size battery, will begin a series of high intensity strobe light pulses, space approximately at one second intervals. Said high intensity strobe light pulses can be easily seen at up to 300 feet away during the brightest day and over 800 feet away during the darkest nights and also includes inclement weather conditions like fog or rain because the high intensity light will be reflected off of water molecules and send light in all directions acting as a light amplifier; 9) The fisherman, now alerted, can retrieve the rod, set the hook and play the targeted fish in more traditional manner.

The invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims rather than by the foregoing description, and all changes which come within the meaning and range of equivalency of the claims are therefore intended to be embraced herein.

What is claimed is:

1. An apparatus for fishing, utilizing a fishing rod, reel, bail and line, comprising:
   (a) a plurality of support members, wherein said support members comprise an upper frame of said apparatus;
   (b) a base, wherein said base comprises a lower frame of said apparatus and wherein at least one support member is attached to said base;
   (c) a triggering mechanism, wherein said triggering mechanism comprises:
      (i) a fishing line holder, wherein said fishing line holder quickly secures and releases said line from any reel, set to run free, or the bail set to the open position;
      (ii) an internal sleeve;
      (iii) two 90° Yokes;
      (iv) a triggering arm;
      (v) a counter weight;
      (vi) a switch activator;
      (vii) a trigger/stop bracket, wherein said triggering arm and said switch activator have a near zero drag coefficient at their fixed points due to said internal sleeve; and (viii) a proximity switch, wherein said internal sleeve is housed within and extends through said support member, wherein said triggering arm and said switch activator are connected by said 90° yokes and are supported by said support member through said internal sleeve, wherein said fishing line holder and counter weight are connected at the distal end of said triggering arm, wherein said trigger/stop bracket is proximally connected to said support member, wherein said proximity switch is proximally connected to said support member, wherein said triggering arm and switch activator contemporaneously rotate when said line is pulled, causing said triggering arm and said switch activator to rotate until said triggering arm reaches top dead center of its rotation, wherein said counter weight accelerates said triggering arm into a free gravitational fall while said fishing line holder releases said line, wherein said trigger/stop bracket stops rotation of said triggering arm and said switch activator activates said proximity switch;

(d) a rod holder, wherein said rod holder is attached to a support member; and (d) a signaling mechanism, wherein said signaling mechanism is attached to a support member, wherein said upper frame connects to said lower frame and said rod holder comprises an opening to support said fishing rod, and wherein said line is threaded through said triggering mechanism, said triggering mechanism and said signaling mechanism are activated when said fishing line is pulled.

2. The apparatus of claim 1, wherein said base, is "H" shaped.

3. The apparatus of claim 1, wherein said signaling mechanism comprises:

i) a visual strike indicator, wherein said visual strike indicator is a high intensity strobe light, which is easily seen at least 300 feet away;

ii) an audible strike indicator, wherein said audible strike indicator is of the type that is easily heard over 150 feet away; and iii) at least one power source to power said visual strike indicator and said audible strike indicator, wherein said visual strike indicator and said audible strike indicator are attached to said support member.

4. The apparatus of claim 1, wherein said triggering mechanism, said rod holder and said signaling mechanism are housed in one support member, wherein said apparatus comprises a support member and said base, which may be separated for storage.

5. The apparatus of claim 1, wherein said base comprises wind drag screws.

6. The apparatus of claim 1, wherein said base comprises ballast.

7. An apparatus for fishing, utilizing a fishing rod, reel, bail and line, comprising:

(a) a plurality of support members, wherein said support members comprise an upper frame of said apparatus, (b) a base, wherein said base, indicated by reference numeral 2 in FIG. 10 is "H" shaped, and comprises a lower frame of said apparatus, and wherein at least one support member is attached to said base;

(c) a triggering mechanism, wherein said triggering mechanism comprises:

(i) a fishing line holder, wherein said fishing line holder quickly secures and releases said line from any reel, set to run free, or the bail set to the open position;

(ii) an internal sleeve;
(iii) two 90° Yokes;
(iv) a triggering arm;
(v) a counter weight;
(vi) a switch activator;
(vii) a trigger/stop bracket, wherein said triggering aim and said switch activator have a near zero drag coefficient at their fixed points due to said internal sleeve; and
(viii) a proximity switch, wherein said internal sleeve is housed within and extends through said support member, wherein said triggering arm and said switch activator are connected by said 90° yokes and are supported by said support member through said internal sleeve, wherein said fishing line holder and counter weight are connected at the distal end of said triggering arm, wherein said trigger/stop bracket is proximally connected to said support member, wherein said proximity switch is proximally connected to said support member, wherein said triggering arm and switch activator contemporaneously rotate when said line is pulled, causing said triggering arm and said switch activator to rotate until said triggering arm reaches top dead center of its rotation, wherein said counter weight accelerates said triggering arm into a free gravitational fall while said fishing line holder releases said line, wherein said trigger/stop bracket stops rotation of said triggering arm and said switch activator activates said proximity switch;

(d) a rod holder, wherein said rod holder is attached to a support member; and (e) a signaling mechanism, wherein said signaling mechanism is attached to a support member and wherein said signaling mechanism comprises:

i) a visual strike indicator, wherein said visual strike indicator is a high intensity strobe light, which is easily seen at least 300 feet away;

iv) an audible strike indicator, wherein said audible strike indicator is of the type that is easily heard over 150 feet away; and v) at least one power source to power said visual strike indicator and said audible strike indicator, wherein said visual strike indicator and said audible strike indicator are attached to a support member, wherein said upper frame connects to said lower frame and said rod holder comprises an opening to support said fishing rod, and wherein said line is threaded through said triggering mechanism, said triggering mechanism and said signaling mechanism are activated when said fishing line is pulled, and wherein said triggering mechanism, said rod holder and said signaling mechanism are housed in one support member, wherein said apparatus comprises a support member and a base, which may be separated for storage.

8. The apparatus of claim 7, wherein said triggering mechanism, said rod holder and said signaling mechanism are housed in one support member.

9. The apparatus of claim 7, wherein said base comprises wind drag screws.

10. The apparatus of claim 7, wherein said base comprises ballast.

11. A method of ice fishing, utilizing a fishing rod, a bail, a line and a bait or equivalent thereof, comprising the steps of:

(a) connecting a base to at least one support member, wherein said base comprises a lower frame, said base is "H" shaped, wherein at least one support member is attached to said base, said support member(s) comprising an upper frame;

(b) setting said fishing pole in a rod holder, said rod holder being housed in one of said support members;

(c) threading said fishing line through a fishing line holder of a triggering mechanism, said triggering mechanism being mounted on one of said support members;

(d) setting said bail on said fishing rod to the open position;

(e) activating of said triggering mechanism, and subsequently said signaling mechanism when said a fish pulls on said line, wherein said triggering mechanism comprises:
  a. a fishing line holder, wherein said fishing line holder quickly secures and releases said line from any reel, set to run free, or the bail set to the open position;
  b. an internal sleeve;
  c. two 90° Yokes;
  d. a triggering arm;
  e. a counter weight;
  f. a switch activator;
  g. a trigger/stop bracket, wherein said triggering arm and said switch activator have a near zero drag coefficient at their fixed points due to said internal sleeve; and
  h. a proximity switch, wherein said internal sleeve is housed within and extends through said support member, wherein said triggering arm and said switch activator are connected by said 90° yokes and are supported by said support member through said internal sleeve, wherein said fishing line holder and counter weight are connected at the distal end of said triggering arm, wherein said trigger/stop bracket is proximally connected to said support member, wherein said proximity switch is proximally connected to said support member, wherein said triggering arm and switch activator contemporaneously rotate when said line is pulled, causing said triggering arm and said switch activator to rotate until said triggering arm reaches top dead center of its rotation, wherein said counter weight accelerates said triggering arm into a free gravitational fall while said fishing line holder releases said line, wherein said trigger/stop bracket stops rotation of said triggering arm and said switch activator activates said proximity switch;

(f) wherein said signaling mechanism will be seen over 300 feet away and heard over 150 feet away;

(g) optionally repeating steps b through g; and (h) disconnecting said base and said support member and storing said base, said support member and said fishing rod.

* * * * *